US010800615B2

(12) United States Patent
Coward

(10) Patent No.: US 10,800,615 B2
(45) Date of Patent: Oct. 13, 2020

(54) ELECTROSTATIC CONVEYOR-WHEEL POWDER FEEDER

(71) Applicant: Powder Motion Labs, LLC, Rolla, MO (US)

(72) Inventor: Connor L. Coward, O'Fallon, MO (US)

(73) Assignee: Power Motion Labs, LLC, Rolla, MO (US)

( * ) Notice: Subject to any disclaimer, the term of this patent is extended or adjusted under 35 U.S.C. 154(b) by 98 days.

(21) Appl. No.: 16/352,435

(22) Filed: Mar. 13, 2019

(65) Prior Publication Data
US 2019/0283982 A1 Sep. 19, 2019

Related U.S. Application Data

(60) Provisional application No. 62/643,963, filed on Mar. 16, 2018.

(51) Int. Cl.
*B65G 54/02* (2006.01)
(52) U.S. Cl.
CPC ........ *B65G 54/02* (2013.01); *B65G 2201/042* (2013.01)
(58) Field of Classification Search
CPC .............. B65G 54/02; B65G 2201/041; B65G 2201/042; G01F 11/003; G05D 7/06; G05D 7/0605
USPC ....................................................... 222/196
See application file for complete search history.

(56) References Cited

U.S. PATENT DOCUMENTS

| 827,770 | A | | 8/1906 | Woodsome | |
|---|---|---|---|---|---|
| 960,470 | A | | 6/1910 | Wentworth | |
| 2,180,804 | A | * | 11/1939 | Fahrenwald | .............. B03C 7/00 |
| | | | | | 209/127.2 |
| 2,187,717 | A | | 1/1940 | Weyandt | |
| 2,197,864 | A | | 4/1940 | Johnson | |
| 2,361,946 | A | | 11/1944 | Johnson et al. | |
| 3,517,861 | A | | 6/1970 | De La Vega | |
| 3,534,787 | A | | 10/1970 | Heck | |
| 3,788,449 | A | | 1/1974 | Baberowski et al. | |
| 3,909,068 | A | | 9/1975 | Coucher | |
| 4,071,169 | A | * | 1/1978 | Dunn | .................. B01F 13/0001 |
| | | | | | 222/71 |

(Continued)

*Primary Examiner* — Benjamin R Shaw
(74) *Attorney, Agent, or Firm* — Don V. Kelly; Evans & Dixon, L.L.C.

(57) ABSTRACT

A powder feeder includes a hopper holding powder particles and a rotating conductive wheel having a rim. The rim has a powder landing surface in a groove in the rim. As the wheel rotates, the powder landing surface is disposed below the hopper. A voltage supply electrically communicates with an electrode and the wheel. The electrode and powder landing surface have a space between them. An insulator is disposed between the electrode and the wheel. The voltage supply produces an AC electric potential between the electrode and the rim that creates an alternating electric field within the space. An outlet chamber is positioned below the wheel. The electric field created within the space causes powder particles falling onto the powder landing surface and rotating under the electrode to develop an electrical surface charge. An electrostatic force causes powder particles to oscillate between the pile and the insulator. After a period of oscillation the particles drop over the edges of the rim and into the chamber.

20 Claims, 12 Drawing Sheets

(56) References Cited

U.S. PATENT DOCUMENTS

Figure 1:
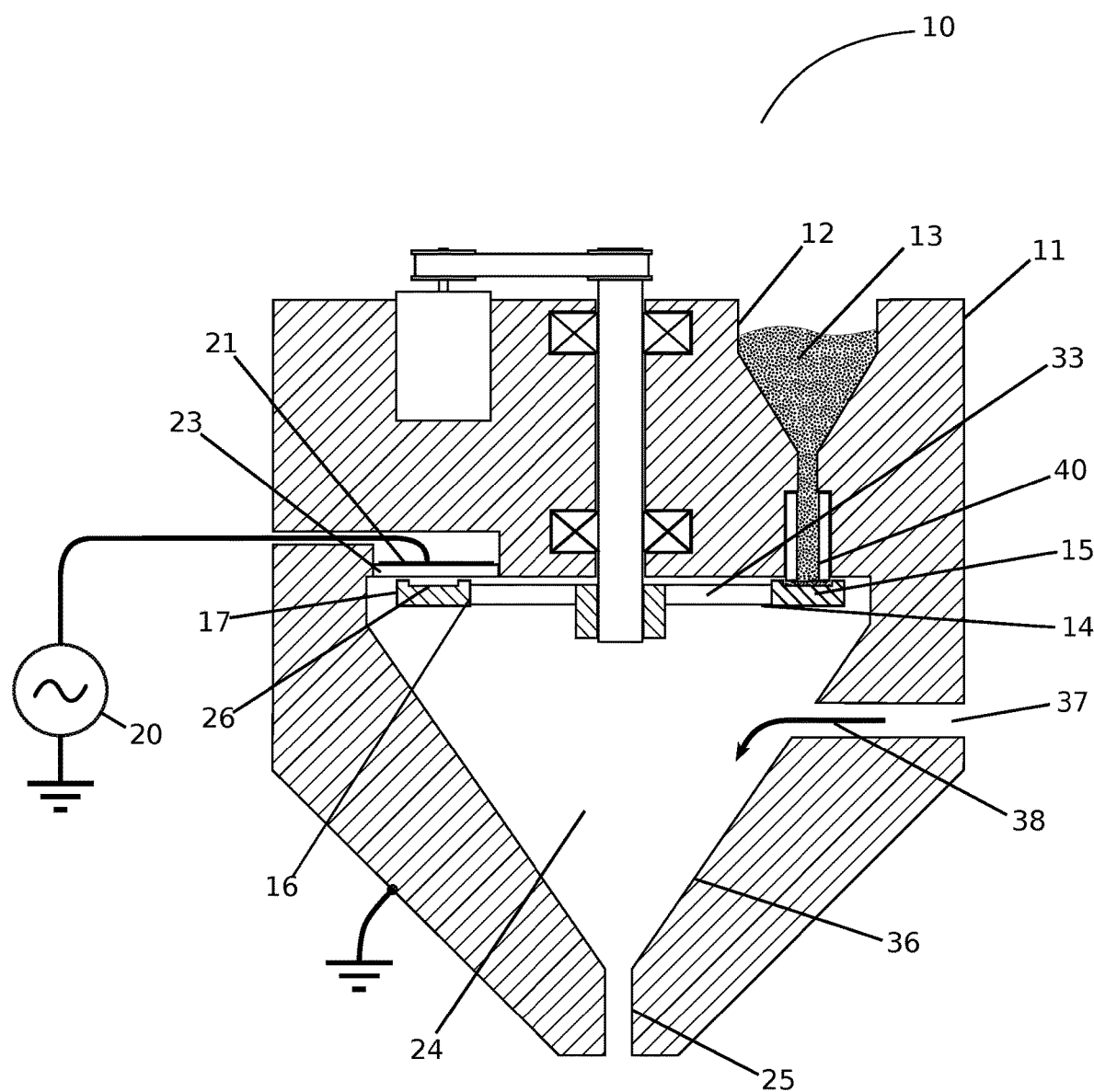

| | | | |
|---|---|---|---|
| 4,172,028 A | 10/1979 | Dunn | |
| 4,227,835 A * | 10/1980 | Nussbaum | B05B 7/144 |
| | | | 222/636 |
| 5,484,061 A | 1/1996 | Dunn | |
| 5,551,642 A * | 9/1996 | Dunn | B03C 7/04 |
| | | | 241/301 |
| 5,769,276 A * | 6/1998 | Alexander | B05B 5/047 |
| | | | 222/148 |
| 6,122,564 A | 9/2000 | Koch | |
| 6,471,096 B1 * | 10/2002 | Dave | B65D 88/64 |
| | | | 222/196 |
| 6,651,843 B2 | 11/2003 | Kowalsky et al. | |
| 10,035,219 B2 * | 7/2018 | Coward | B23K 26/147 |
| 10,213,797 B2 | 2/2019 | Coward et al. | |
| 10,236,780 B2 | 3/2019 | Coward et al. | |
| 2002/0189977 A1 * | 12/2002 | Maehata | B03C 7/06 |
| | | | 209/128 |
| 2015/0268099 A1 | 9/2015 | Craig | |
| 2018/0243769 A1 * | 8/2018 | Coward | B05B 7/1404 |

* cited by examiner

ELECTROSTATIC CONVEYOR-WHEEL POWDER FEEDER

CROSS REFERENCE TO RELATED APPLICATION

This application claims the benefit of and incorporates by reference the entirety of U.S. Provisional Patent Application No. 62/643,963 filed on Mar. 16, 2018.

STATEMENT REGARDING FEDERALLY SPONSORED RESEARCH OR DEVELOPMENT

Not applicable.

SEQUENCE LISTING, TABLE OR COMPUTER PROGRAM ON COMPACT DISC

No applicable.

FIELD OF INVENTION

This invention relates to techniques for feeding finely-divided particulate matter for use in manufacturing, measuring and processing applications. More specifically, this invention relates to methods for feeding metallic or conductive powders into equipment for metal additive manufacturing, welding, or cladding.

BACKGROUND OF THE INVENTION

In metal additive manufacturing, welding, and cladding applications, the quality of the powder stream is an important factor in build quality. It is important that the powder be consistently and accurately metered into the process at a wide range of powder feed rates.

The prior art discloses a variety of apparatuses for mechanically metering powder. For example, the prior art discloses apparatuses that meter powder via a combination of mechanical moving elements and a motive gas. U.S. Pat. No. 3,909,068 (Coucher) and U.S. Pat. No. 3,517,861 (De La Vega) disclose examples of such devices. U.S. Pat. No. 4,227,835 (Nussbaum) discloses an apparatus that feeds powder using a continuous annular groove on a rotating metering plate (disc) and then sucks the powder out of the groove after the plate has rotated through a certain angle.

Conveyor disc-based powder feeders dominate the market for precision powder feeders today due to their relatively smooth and consistent powder flow, but they require large amounts of gas flow to operate. As shown in Nussbaum FIG. 1, the prior art powder feeder includes rotating disc 1. As shown in that FIG. 1, powder from powder container 15 falls into groove 12 in conveyor disc 1. Conveyor disc 1 rotates, carrying powder to suction device 10. Pressurized gas is fed through tube 16 and eventually exits through discharge tube 19, carrying metered powder with it.

Prior art conveyor-disc powder metering devices like those of Nussbaum can give smooth and accurate powder flow. However, the conveyor-disc feeder of the prior art has several drawbacks. In a first respect, the prior art disc feeder requires significant gas flow alongside the powder in order to effect the suction force required to evacuate the groove. This can be a problem for applications that require low gas flow or zero gas flow. Second, some processes also require the ability to change gas flow independently of powder flow. This isn't easy to do with existing conveyor disc feeders. Third, the geometry of the suction device of Nussbaum is fairly complex and expensive to manufacture. Fourth, rotary disc feeders involve many moving parts and seals, which parts and seals increase the complexity and ultimately the cost of the powder feeder. Fifth, processes that require powder metering in a vacuum are clearly not compatible with this type of powder feeder. Sixth, at low disc rotation speeds, powder is pulled from the groove inconsistently in prior-art conveyor-disc feeders causing pulsations in powder flow at low flow rates. Manufacturers mitigate this problem by offering replaceable discs with several sizes of grooves for different flow rate ranges. However, many processes require both high and very low powder flow rates in one setup. Perforated-disc type powder feeders are also commonly used. Perforated-disc type powder feeders do not require as much gas as a normal conveyor disc feeder. However, such devices are also subject to pulsations in powder flow as each perforation in the disc releases a small amount of powder. Again, at low flow rates, this effect is more pronounced.

There are devices that are employed to meter powder that do not use the "disc and gas" arrangement described above. For example, auger-type powder feeders are used commonly in industry. These feeders use a rotating screw or turbine wheel to move powder from a hopper into the process destination. With these feeders, often the rotation of the screw results in periodic pulsations of powder as the screw turns. Additionally, due to the abrasive nature of metallic powders, high wear typically occurs on the screw and drive components. One solution to the problems associated with auger-type powder feeders is the vibratory feeder. For example, U.S. Pat. No. 2,187,717 (Weyandt) describes a vibratory electrical apparatus for conveying or handling difficult to move or handle materials, such as pastes, powders, sand, gravel, packages, articles and the like. U.S. Pat. No. 3,788,449 (Baberowski, et al) discloses a vibratory conveyor capable of periodic rotational and vertical vibrations. Vibration-based powder feeders can be sensitive to the mass of powder in the hopper, causing inconsistent powder flow. Additionally, gas-free powder feeders, like the auger and vibratory devices, do not generally provide the accuracy and feed rate stability that conveyor disc powder feeders provide.

It is also known to use only electrostatic forces to meter power. Pure electrostatic powder feeders do not require gas and can produce a powder flow rate free of high frequency oscillations that many other powder feeders exhibit. However, pure electrostatic powder feeders can experience a slow drift in powder flow rate over long time periods. Also, they are not as well tested in industry as disc-based powder feeders.

In view of the deficits of the prior art powder metering devices, an improved powder metering device is desirable. In particular, it would be desirable to provide a powder-metering device that provides the benefits of the conveyor-disc feeder without all of the deficits.

SUMMARY OF THE INVENTION

The invention is directed to an improved conveyor powder feeder that utilizes electrostatics to provide a smoother powder flow. In one embodiment, the inventive powder feeder includes a body including a hopper. The hopper is shaped and sized to hold a supply of powder particles. The feeder further includes a rotating conductive wheel having a rim. The rim has an inner radial edge, an outer radial edge and a powder landing surface disposed on the rim between the inner radial edge and the outer radial edge. The powder landing surface is disposed below the hopper such that gravity acting upon the powder particles within the hopper causes the powder particles to fall upon the powder landing surface and create a pile of powder particles on the powder landing surface.

A voltage supply is in electrical communication with an electrode and the wheel rim. The electrode and powder landing surface have a space between them. An insulator is disposed between the electrode and the wheel. The voltage supply produces an alternating current electric potential between the electrode and the wheel that creates an alternating electric field within the space. A chamber is positioned below the wheel. The chamber has an outlet. The electric field created within the space causes the powder particles falling onto the powder landing surface and rotating under the electrode to develop an electrical surface charge and be subject to an electrostatic force that causes the powder particles to oscillate between the pile and the insulator. After a period of oscillation, the powder particles drop over either or both of the inner radial edge and outer radial edge and into the chamber. In alternative embodiments to the preferred embodiment feeder, the feeder can have electrodes of different shapes and orientations to modulate particle oscillation.

Figure 6:
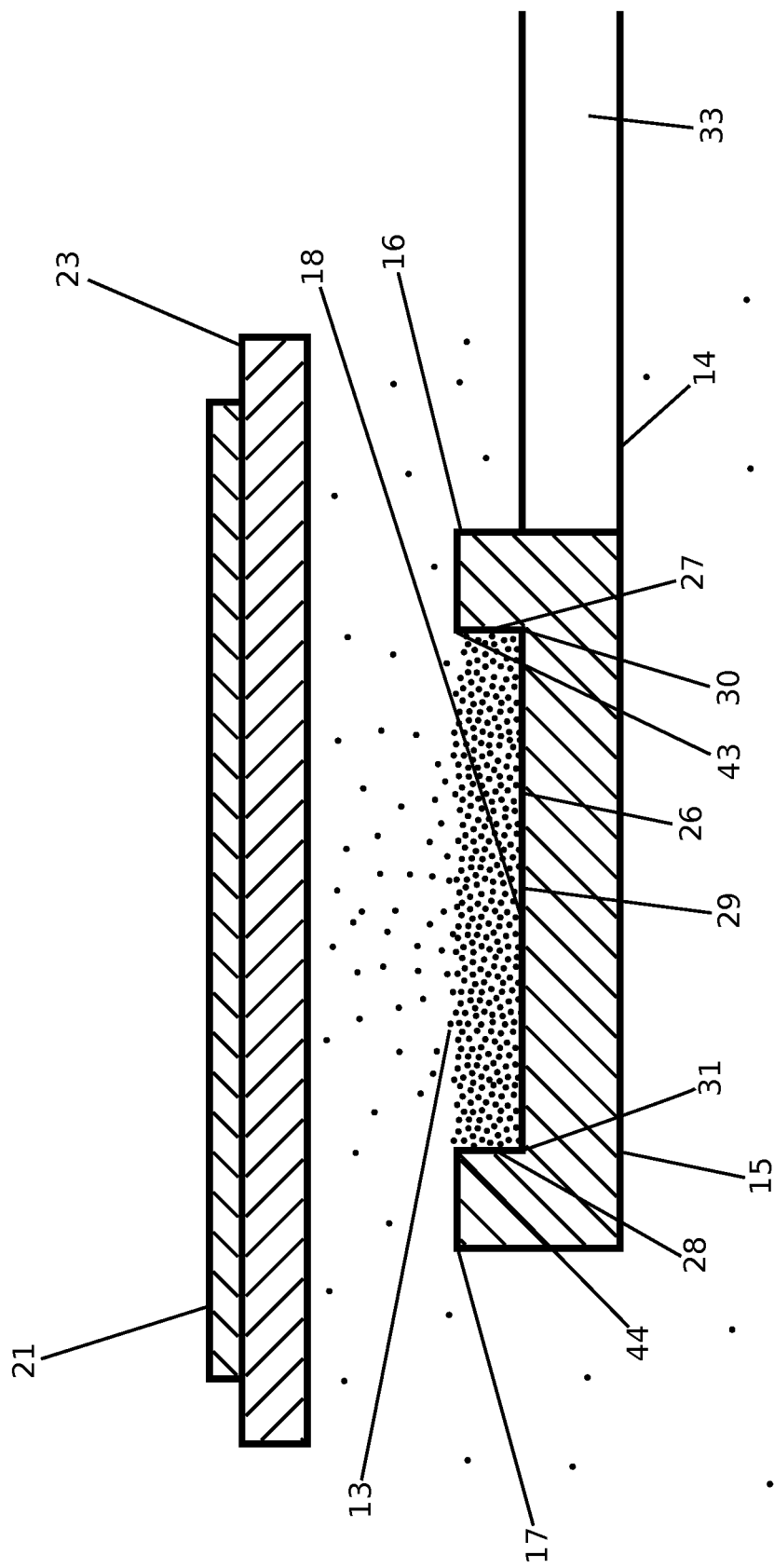

The inventive conveyor powder feeder thus utilizes an electrostatic clearing mechanism rather than gas suction powder evacuation. In contrast to the prior art, powder particles, fall over the edges of the wheel rim rather than being sucked out of the groove with gas. Existing disc-based powder feeders require high gas flow in order to evacuate the groove of powder. This makes it difficult if not impossible to use such feeders with processes that require low or no gas flow. In contrast, the invention allows low or zero gas flow, while still using the industry standard conveyor-disc type powder feed mechanism. The invention could, therefore, be used for processes that benefit from low gas flow. The electrostatic oscillation exploited by the invention provides very consistent powder flow at low powder flow rates (under 1 gram per minute). This is because the electrostatic oscillation exploited by this invention has a tendency to smooth powder flow as it is pulled from the groove.

In certain situations, it is advantageous for the inventive conveyor powder feeder to include one or more alternative groove clearing mechanisms in addition to the electrostatic clearing mechanism. For instance, for processes that can tolerate some gas flow, a gas jet may be added along the wheel groove to clear residual powder that is not able to be removed by the electrode. A gas jet alone does not provide consistent powder flow at low flow rates but is typically able to clear large amounts of powder. Conversely, the electrode provides smooth flow at low flow rates but has a lower capacity to evacuate powder from the groove. A powder feeder featuring first an electrode then a gas jet along the groove has excellent performance for both high and low powder flow rates.

BRIEF DESCRIPTION OF THE. DRAWINGS

FIG. 1 is a cross section view of an embodiment present invention powder feeder showing a suggested architecture of the wheel, groove and electrode of the feeder.

FIG. 2 is a detail view of the architecture of the wheel, groove and electrode of an embodiment powder feeder of the present invention. The view shows field lines between the wheel and electrode.

FIG. 3 is a perspective view of an embodiment of the present invention.

FIG. 4 is a plan view of an embodiment of the present invention powder feeder depicting electrode and wheel geometry.

FIG. 5 is a detail view of the structure and relative positioning of the electrode, insulator and Wheel rim of a first embodiment of the present invention powder feeder.

FIG. 6 is a detail view of the structure and relative positioning of the electrode, insulator and wheel rim of a second embodiment of the present invention powder feeder in which the wheel rim includes a groove for restraining powder on the rim landing surface.

FIG. 7 is a cross section view with circuit schematic of an alternate embodiment feeder having a chevron-shaped electrode and insulator.

FIG. 8 is a cross-section view with circuit schematic of an alternate embodiment feeder having an electrode and insulator angled relative to the wheel.

FIG. 9 is a plan view of an alternate embodiment of the present invention powder feeder depicting an electrode with a circular geometry.

FIG. 10 is a plan view of an alternate embodiment of the present invention powder feeder depicting an electrode with a rectangular geometry.

FIG. 11 is a perspective view of an alternate embodiment of the present invention powder feeder having a gas jet groove evacuation mechanism.

FIG. 12 is a partial sectional view of the powder feeder depicted in FIG. 11 detailing the functionality of the gas jet nozzle and gas jet on residual powder located in the groove of the wheel rim.

DETAILED DESCRIPTION

The various embodiments of the present invention will hereinafter be described in conjunction with the figures accompanying this application. Rather than using suction gas to evacuate the groove, the invention uses electrostatic forces to evacuate powder from the groove of a conveyor wheel. FIGS. 1-10 depict features of embodiment powder feeders 10 according to the present invention along with variations of structures to same. In one embodiment, powder feeder 10 has body 11 that includes hopper 12. Hopper 12 is shaped and sized to hold a supply of powder particles 13. Powder feeder 10 includes rotating conductive wheel 14 having a rim 15. Rim 15 has an inner radial edge 16, outer radial edge 17 and powder landing surface 18 disposed on rim 15 between inner radial edge 16 and outer radial edge 17. As shown in FIG. 5, powder landing surface 18 may comprise a simple planar surface.

Rim 15 and powder landing surface 18 are disposed within body 11 below hopper 12 such that gravity acting upon powder particles 13 within hopper 12 causes powder particles 13 to fall upon revolving powder landing surface 18 and create a pile 19 of powder particles 13 on powder landing surface 18 as rim 15 rotates (revolves) under hopper 12. Powder feeder 10 includes voltage supply 20 in electrical communication with electrode 21 and wheel 14. Electrode 21 and powder landing surface 18 have a space 22 between them.

Insulator 23 is disposed between electrode 21 and wheel 14. Voltage supply 20 produces an alternating current electric potential between electrode 21 and wheel 14 that creates an alternating electric field 35 within space 22. Chamber 24 is positioned below wheel 14. Chamber 24 has an outlet 25. The electric field created within space 22 causes powder particles 13 falling onto powder landing surface 18 and revolving under electrode 21 to develop an electrical surface charge and be subject to an electrostatic force that causes powder particles 13 to oscillate between pile 19 and insulator 23. After a period of oscillation, powder particles 13 drop over either inner radial edge 16 or outer radial edge 17 and into chamber 24. In the preferred embodiment powder feeder 10, powder landing surface 18 includes groove 26. The structure of groove 26 is shown in FIG. 6. Groove 26 is defined by inner radial sidewall 27 on inner radial edge 16, outer radial sidewall 28 on outer radial edge 17 and floor 29 extending from the bottom 30 of inner radial sidewall 27 to the bottom 31 of outer radial sidewall 28.

The inclusion of groove 26 is not critical to the invention, but allows rim 15 to more reliably convey powder particles. In this respect, powder falling on landing surface 18 tends to form an "angle of repose" and pile up on landing surface 18. So as long as rim 15 is wide enough, powder won't pour directly from hopper 12 over the edges 16, 17 of rim 15. Groove 26 is a preferable feature because it constrains the powder falling on revolving rim 15 to stay within rim 15 of wheel 14 as wheel 14 rotates around hub 34. Groove 26 thus helps to keep the powder flow rate consistent. This is because the angle of repose for fine particulates like powder is not always exact. It can change with factors including, but not limited to, temperature, humidity and powder morphology. Also, if powder feeder 10 is slightly tilted and does not include groove 26, the feeding performance of powder feeder 10 can be affected and feeder 10 will perform varyingly. Groove 26 thus helps ensure there is a consistent ribbon of powder conveyed from the hopper to electric field 35.

Figure 2:
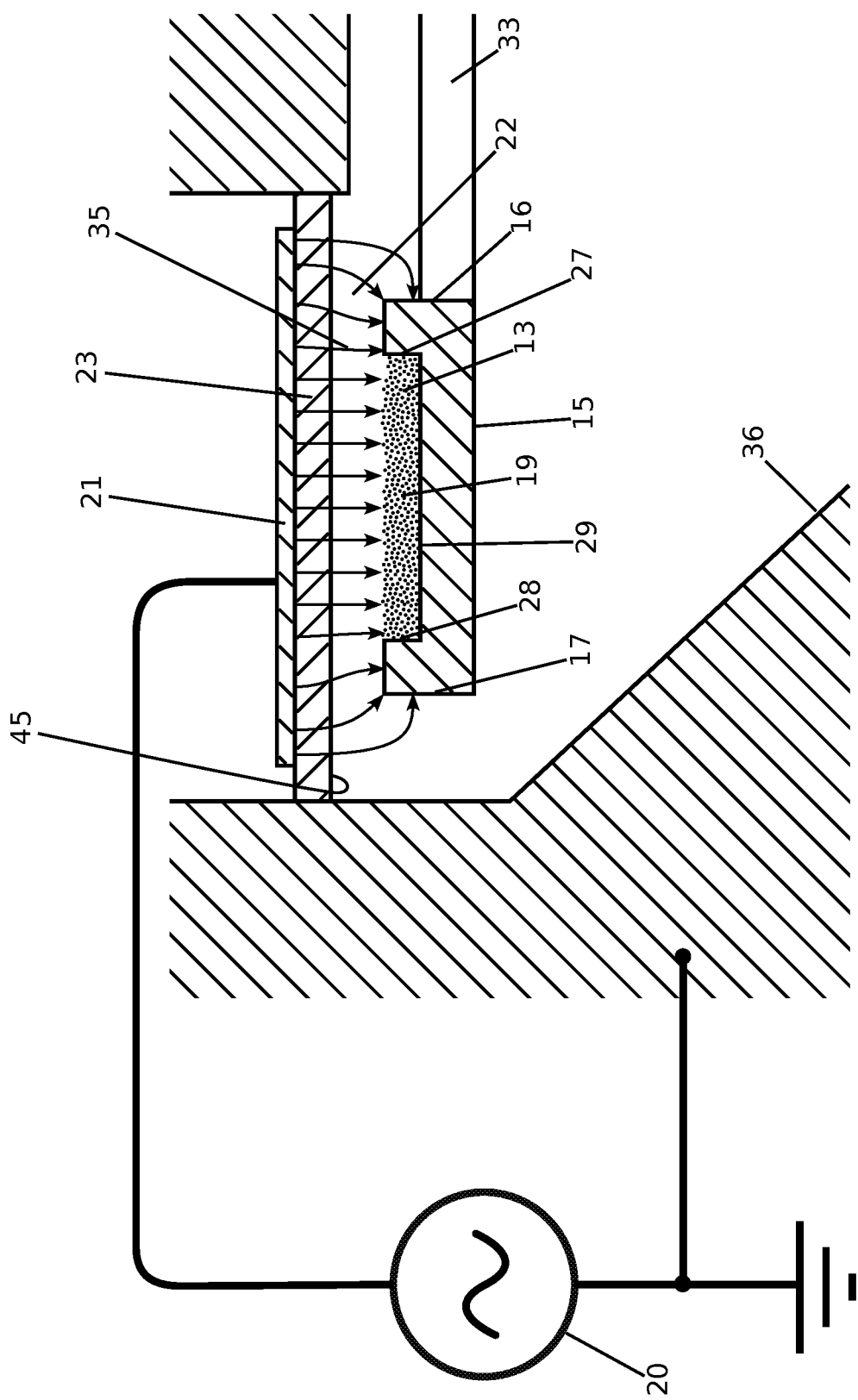
Figure 3:
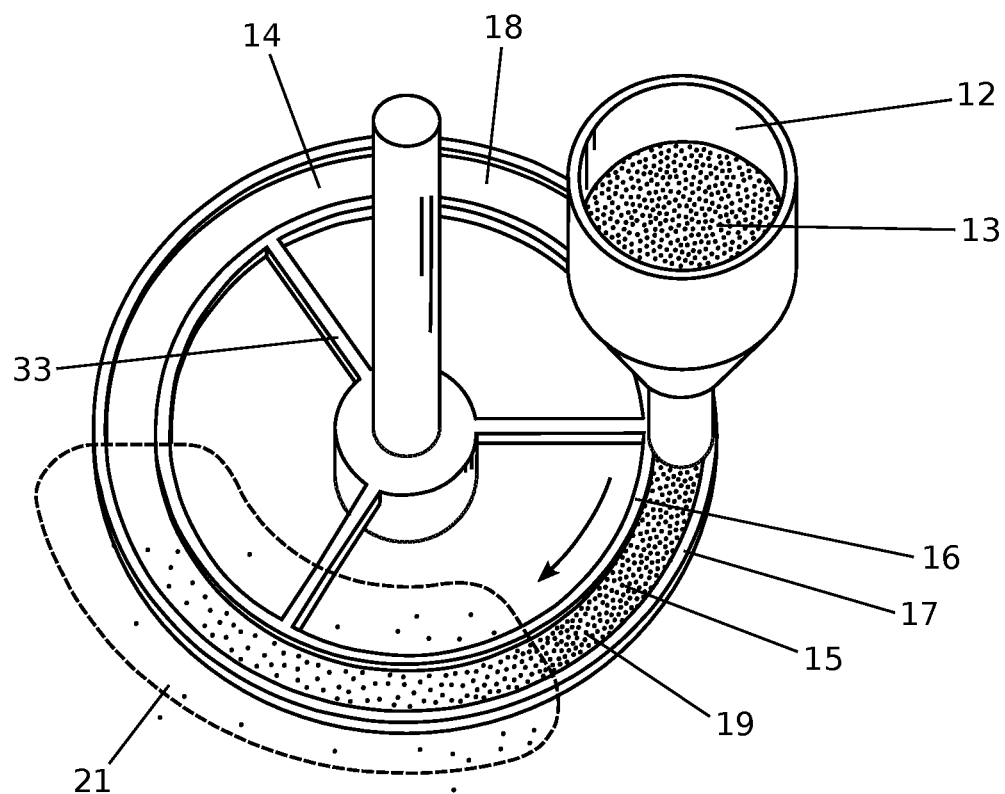

The operation of the embodiment powder feeder 10 will now be described. As seen in FIGS. 1-3, powder 13 from hopper 12 falls into groove 26 in rim 15 of revolving wheel 14. The interior 32 of wheel 14 is preferably largely open with only thin spokes 33 connecting wheel 14 to hub 34. As wheel 14 rotates powder in groove 26 moves beneath electrode 21. Referring to detail view FIGS. 1-3, a high-voltage signal from supply 20 is applied to electrode 21 causing alternating electric field 35 to develop between electrode 21 and powder 13 of pile 19.

Note that wheel 14 must be conductive and electrically connected to the opposite terminal of AC supply 20 as is electrode 21. Preferably, wheel 14 and body 11 of powder feeder 10 are both conductive and connected to earth-ground as shown in FIG. 3. Electric field 35 causes powder 13 to oscillate between wheel 14 and insulator 23. Particles 13 oscillating between insulator 23 and wheel 14 are urged to move outward and off the edges 16, 17 of wheel 14 primarily due to inter-particle collisions. Because inter-particle collisions are more likely to occur in regions of higher particle concentration, the net force due to these collisions causes particles to move from regions of higher concentration to lower concentration. Thus, oscillating, particles tend to move horizontally over edges 16, 17 of wheel 14. As shown in FIGS. 1-3, once particles 13 fall over edges 16, 17 of wheel 14, they are collected by funnel structure 36 of chamber 24 and directed towards outlet 25. In a more preferred embodiment, body 11 of powder feeder 10 may be constructed to provide for the intake of a earlier gas to propel metered powder particles 13 out through outlet 25. In this respect, body 11 can include gas inlet 37 through which a carrier gas (shown representatively by arrow 38) can be injected into chamber 24. When feeder 10 includes inlet 37, body 11 should be sealed such that gas 38 injected into inlet 37 must exit through outlet 25 along with the metered powder stream.

For purposes of enhanced operation, in the preferred embodiment, electrode 21 is positioned above a portion 42 of rim 15 of revolving wheel 14 and should be wider (in the radial dimension from the perspective of hub 34) than groove width $W_g$ of groove 26 of rim 15 of wheel 14. Electrode 21 should cover as much of the groove 26 as possible due to it taking time for powder 13 on pile 19 to evacuate from groove 26. Additionally, insulator 23 should be sized and positioned (i.e., situated between electrode 21 and wheel 14) to separate electrode 21 from the powder 13. Insulator 23 operates to prevent direct current from passing between electrode 21 and powder pile 19 and wheel 14 while still allowing electric field 35 to pass through it. In a most preferred embodiment, insulator 23 should be hermetically sealed to body 11 to keep powder 13 away from electrode 21. Otherwise an arc discharge could occur, which, in turn, would sharply reduce the voltage between electrode 21 and wheel 14, leading to failure of the device. Typically, insulator 23 has an identical, but slightly larger shape as electrode 21 to ensure electrical isolation between electrode 21 and body 11.

The more groove area covered by electrode 21, the faster wheel 14 may rotate around hub 34 while still completely evacuating groove 26 of powder. If the wheel revolution speed is too fast, powder particles 13 of pile 19 will not have sufficient time to evacuate groove 26 before revolving away from electrode 21. If full groove evacuation does not occur, powder feeder 10 will feed less powder than expected for the given wheel rotation speed.

Figure 4:
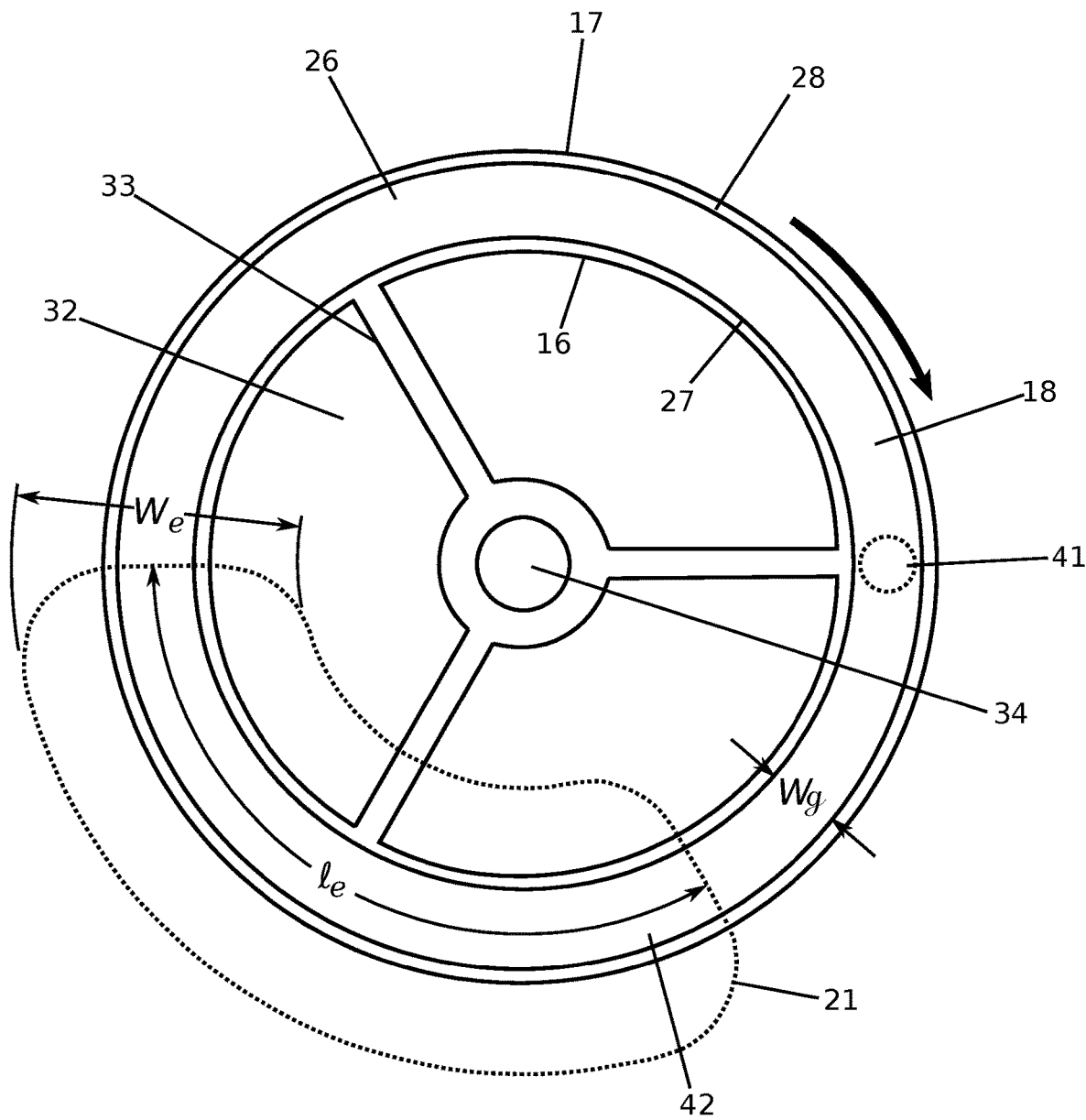
Figure 5:
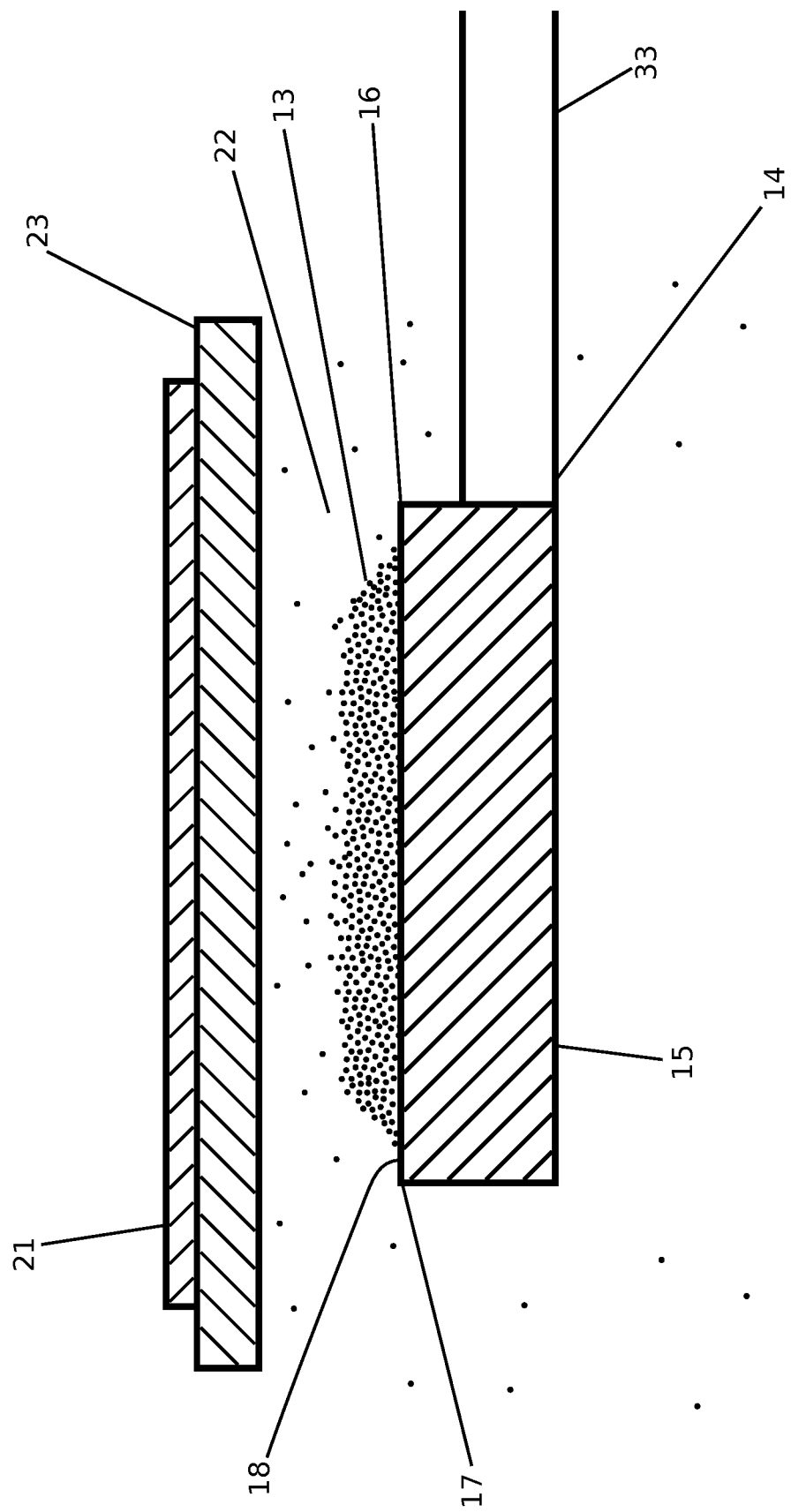

FIG. 4 shows a top view of preferred electrode 21 and wheel rim 15 geometry and positioning. In operation, powder will drop from hopper 12 onto powder landing surface 18 in groove 26 through hopper dispensing chute 40 (shown in FIG. 1). As shown in FIG. 4, powder will land at area 41 located below dispensing chute 40. As wheel rim 15 revolves towards electrode 21, powder originally landing at area 41 will enter the region 42 beneath electrode 21. Once in region 42, the powder particles in groove 26 of rim 15 will begin to oscillate. This oscillation generates horizontal motion as described previously. After a period of oscillation, the powder that fell on to rim 15 and that was delivered under electrode 21 will move over inner radial edge 16 and outer radial edge 17 of rim 15.

As shown on FIG. 4, there are some very important dimensions in terms of electrode 21 and rim 15 and groove 26. In this respect, inner radial sidewall 27 and outer radial sidewall 28 on rim 15 are separated by a groove width $W_g$. Electrode 21 has a radial electrode width $W_e$, which is the width of electrode 21 measured in the radial direction toward or away from hub 34. In the preferred embodiment, to maximize the ability of electrode 21 to evacuate powder from pile 19 in groove 26, radial electrode width $W_e$ should be greater than radial profile width $W_g$ between sidewalls 27, 28 of groove 26. More preferably, experiments have shown that the electrode width $W_e$ should be between two to three times groove width $W_g$ of groove 26. Additionally, as shown in FIG. 4, electrode 21 has an arc length $l_e$, which is the arcuate length of that portion of electrode 21 superposed above groove 26. Arc length $l_e$ of electrode 21 should be as large as possible. If arc length $l_e$ is too small, powder will not have sufficient time to evacuate groove 26 before revolving out of the region beneath electrode 21.

Whether powder is able to fully evacuate groove 26 depends on a number of factors including wheel rotation speed, peak electrode voltage, groove depth, distance between electrode and wheel, etc. In practice, these parameters were determined experimentally. Table 1 shows some design parameters which have been experimentally shown to work well.

TABLE 1

Experimental Design Parameters

| Parameter | Recommended Value |
|---|---|
| peak AC electrode voltage | 3 to 5 kilovolts |
| wheel speed | 0 to 20 rpm |
| wheel diameter | 25 mm to 300 mm |
| electrode arc length | at least 25 mm |
| insulator thickness | 0.2 to 4 mm |
| distance: insulator to groove top | 0.5 to 1.5 mm |
| groove depth | 0.1 to 2 mm |
| AC signal frequency | 30 to 300 Hz |
| particle size | 10 to 150 micron |

As shown in Table 1, when the wheel had a diameter of 25 to 300 millimeters and a rotational speed of 0-20 revolutions per minute, the feeder operated well in feeding powder particles using the other parameters set forth in Table 1. The feeder worked optimally with the above parameters when a portion of electrode 21 superposed groove 26 and the portion of electrode 21 that superposed the groove had an arc length $l_e$ of at least one inch. Additionally, the experiments were undertaken using metallic powders having a particle size of 10 to 150 microns and an alternating current electric potential with a signal frequency of between 30 to 300 Hertz. Inner radial sidewall 27 is proximate (within 5 mm of) inner radial edge 16 and outer radial sidewall 28 is proximate (within 5 mm of) outer radial edger 17. Floor 29 extends between inner radial sidewall 27 and outer radial sidewall 28. Electrode 21 is positioned vertically above a portion 42 of powder landing surface 18 of wheel 14.

Groove depth was also a measured parameter. As noted, groove 26 is formed with floor 29 spanning between the bottom 30 of sidewall 27 and the bottom 31 of sidewall 28. Sidewall 27 has top 43 and sidewall 28 has top 44. Groove depth is the distance from the bottom of one sidewall to its top. Preferred embodiment powder feeder 10 also includes insulator 23 disposed between electrode 21 and rim 15. In the studied experimental feeder, insulator 23 had a thickness of 1.59 millimeters. The distance from groove top (43 or 44) to the insulator was also 1.59 millimeters.

Figure 7:
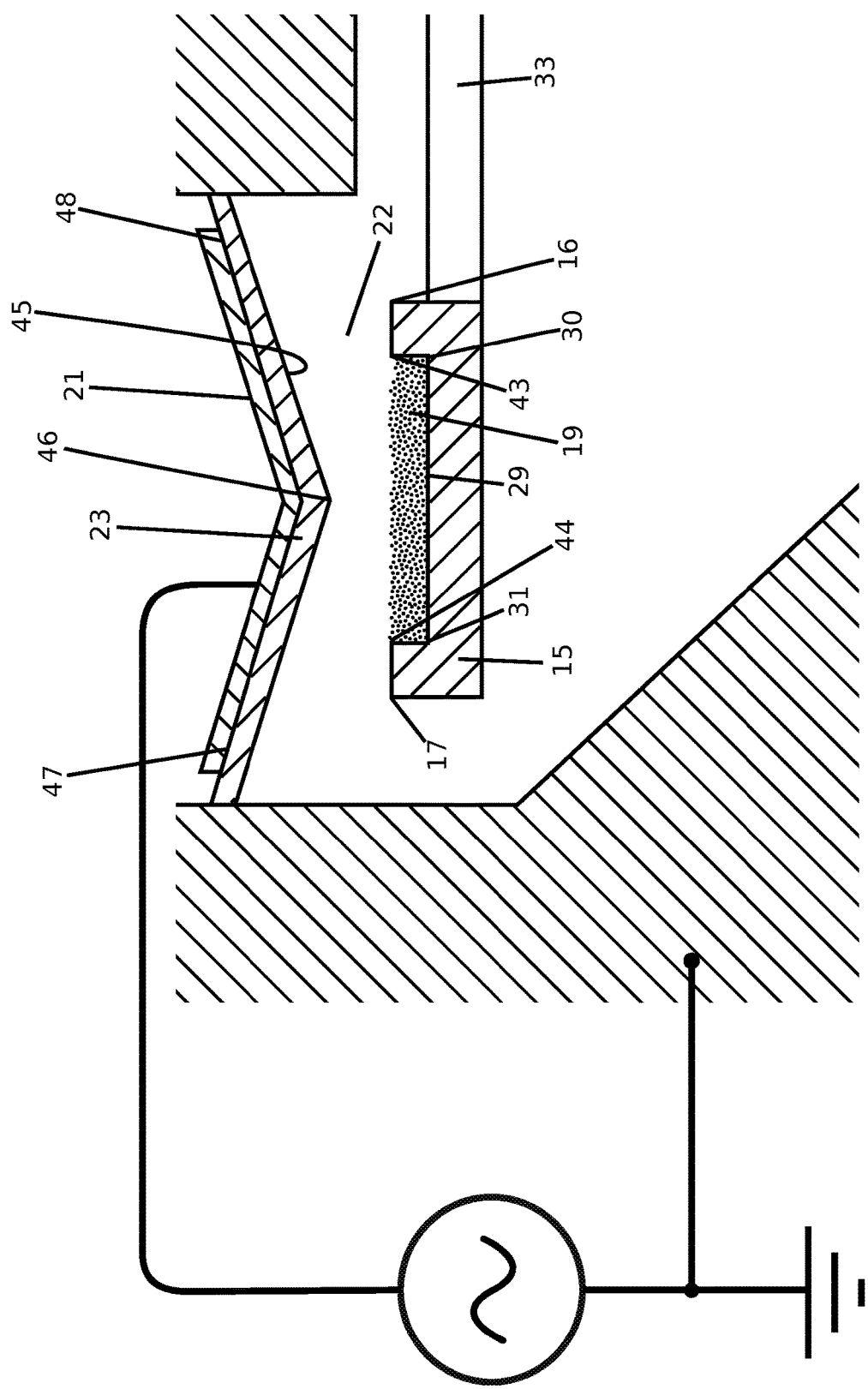
Figure 8:
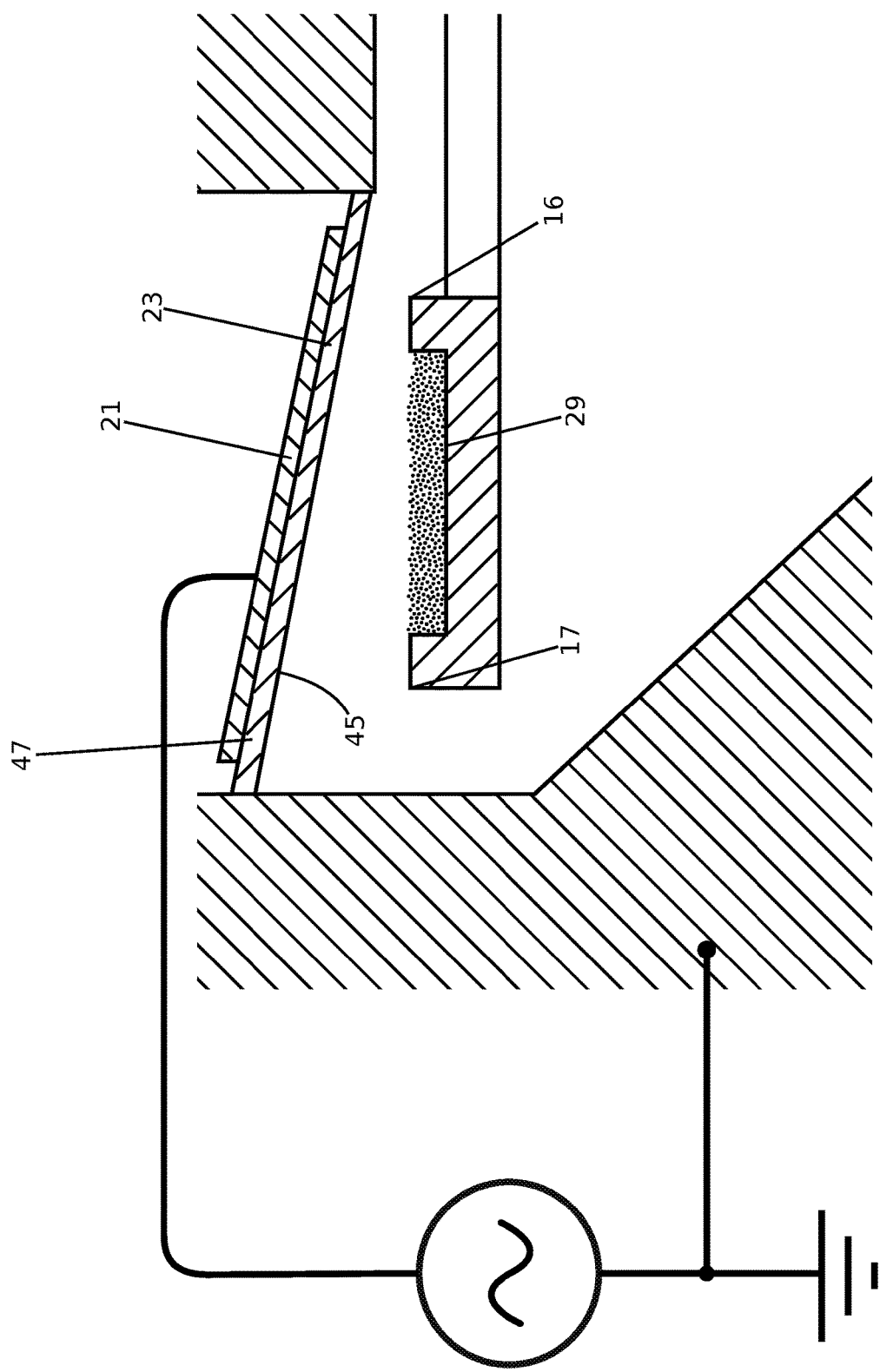

In the embodiment shown in FIGS. 1-4, electrode 21 and insulator 23 are exemplarily shown in construct and orientation for ease of manufacture. In the embodiment shown in FIGS. 1-4, electrode 21 and insulator 23 are disposed parallel to rim 15 and groove 26. In this construct, insulator 23 has a wheel-facing surface 45 and wheel facing surface 45 is flat and parallel to floor 29 of groove 26. However, the electrode geometry can be altered to increase the rate at which powder is cleared from groove 26. Other constructs of electrode 21 and insulator 23 and their orientation relative to groove 26 are thus possible. For example, as shown in FIG. 7, electrode 21 and insulator 23 can be shaped like a chevron with its point 46 directed at groove 26. In the embodiment of FIG. 7, both outer edges 47, 48 of electrode 21 and insulator 23 are angled away from groove 26. In the embodiment of FIG. 8, outer edge 47 of electrode 21 and outer edge 48 of insulator 23 are angled away from groove 26. In this embodiment wheel facing surface 45 of insulator 23 is angled such that wheel facing surface 45 is further from outer radial edge 17 than from inner radial edge 16. The electrode geometries of FIGS. 7 and 8 impart additional horizontal motion to oscillating particles 13 as compared to the embodiment feeder of FIGS. 1-4. As powder particles 13 collide with the angled lower surface of insulator 23, they are reflected outward and over edges 16, 17 of rim 15. The alternate electrode configurations such as shown in FIGS. 7 and 8 are not strictly required for the invention to operate. In this respect, inter-particle collisions alone are enough to impart the horizontal motion required to clear groove 26. These alternate electrode geometries may be used, however, in cases where faster groove clearing is desired.

Figure 9:
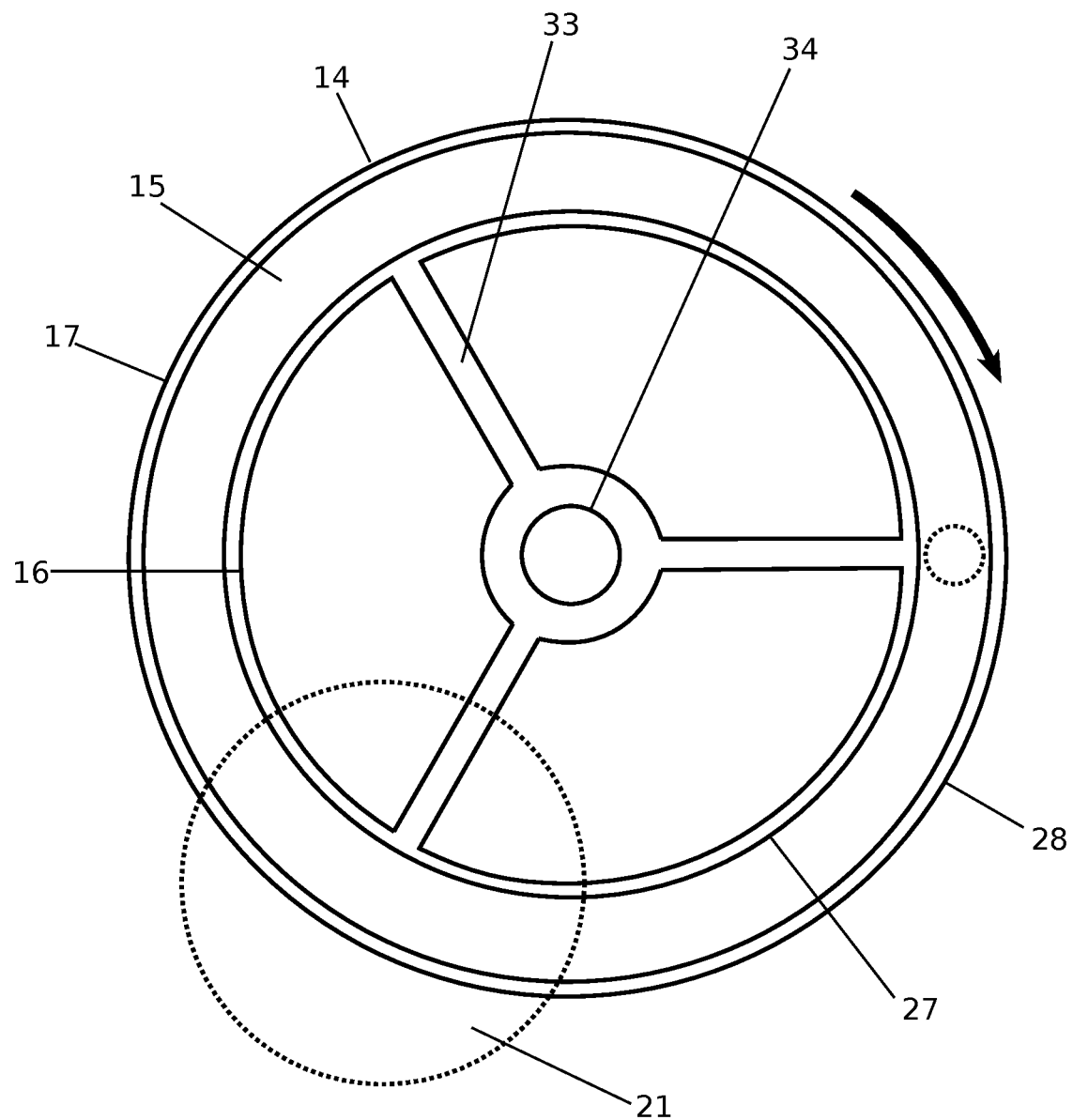
Figure 10:
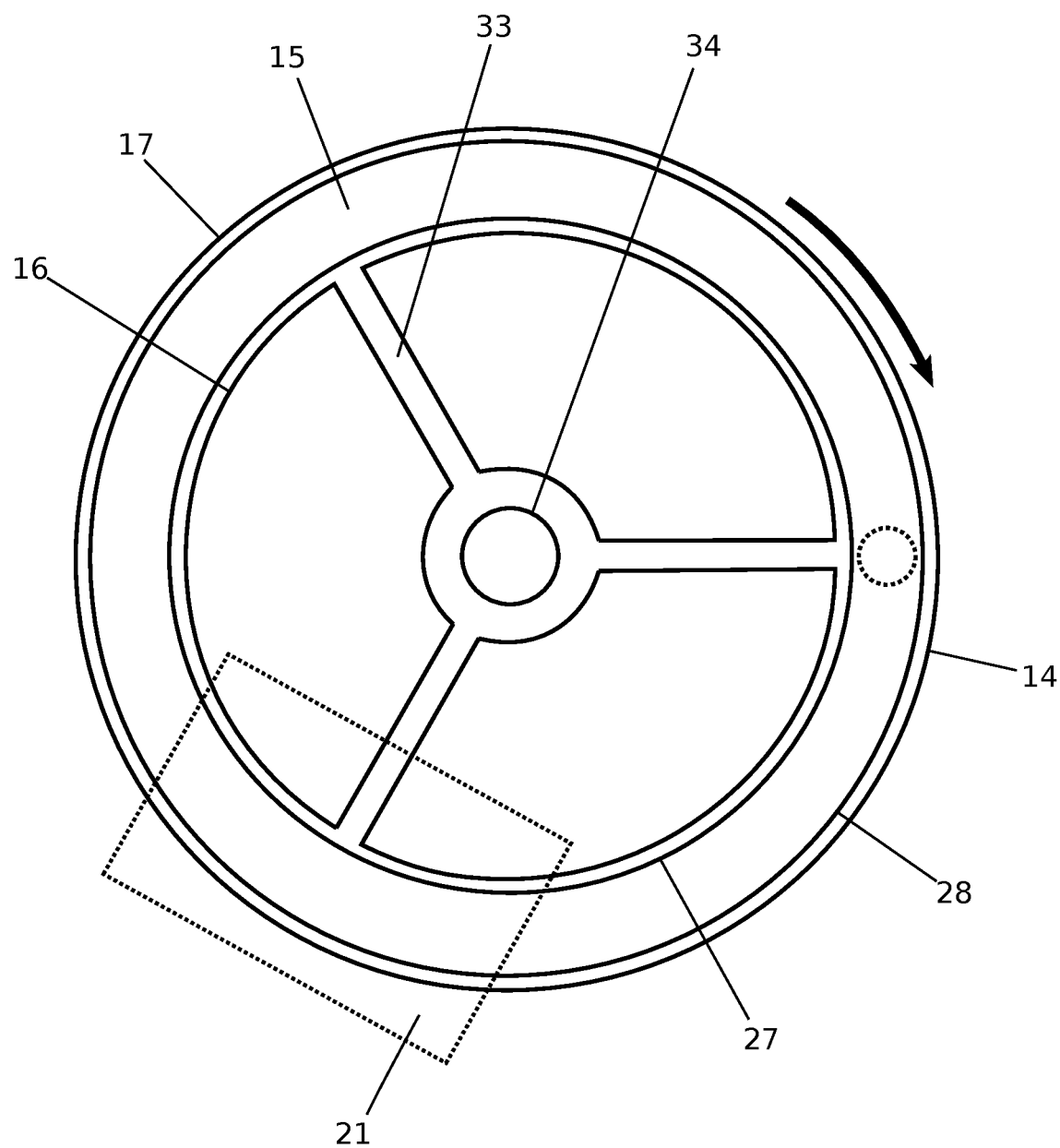

Additionally, in other embodiments, the shape of electrode 21 can be different than that shown in FIG. 4. For example, as shown in FIG. 9, feeder 10 can have an electrode 21 that is circular in shape (as viewed from an overhead or plan view). Alternatively, feeder 10 can have an electrode 21 that is rectangular in shape as is shown in FIG. 10. Also, multiple electrodes along groove 26 can, of course, be used as well. In the case of multiple electrodes, the voltage, electrode stand-off distance, size, etc. can be different for each electrode. This approach can be advantageous for optimizing the powder feeder for different powder properties (size, density, conductivity, etc).

Figure 11:
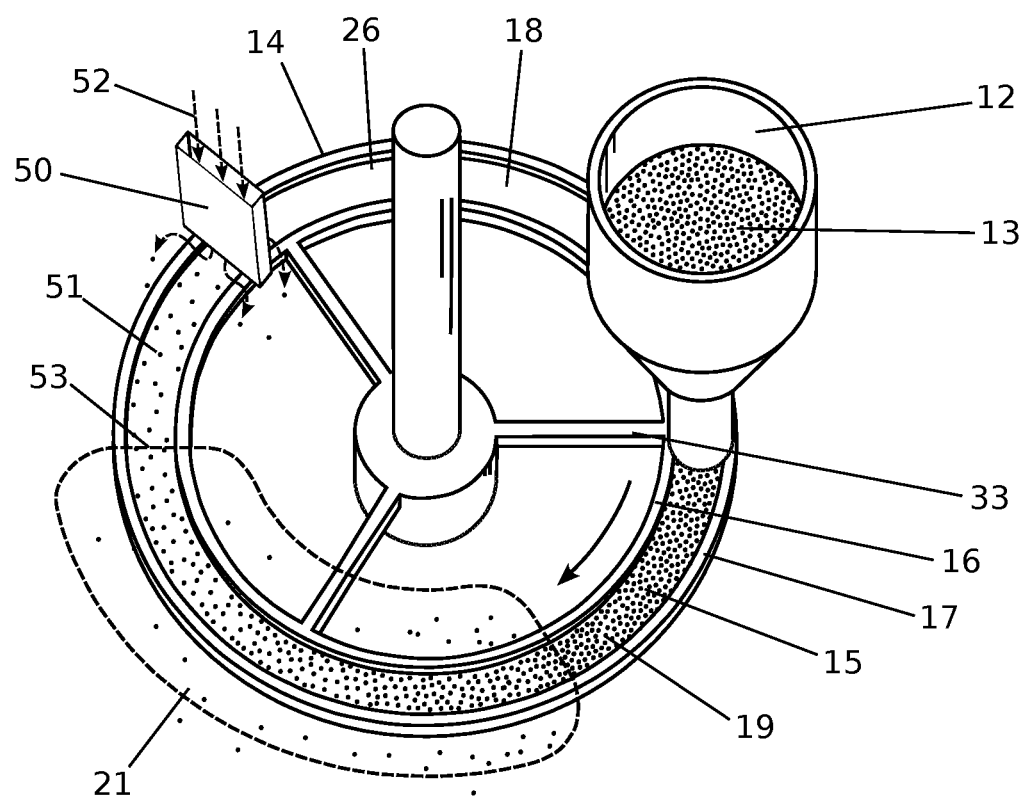
Figure 12:
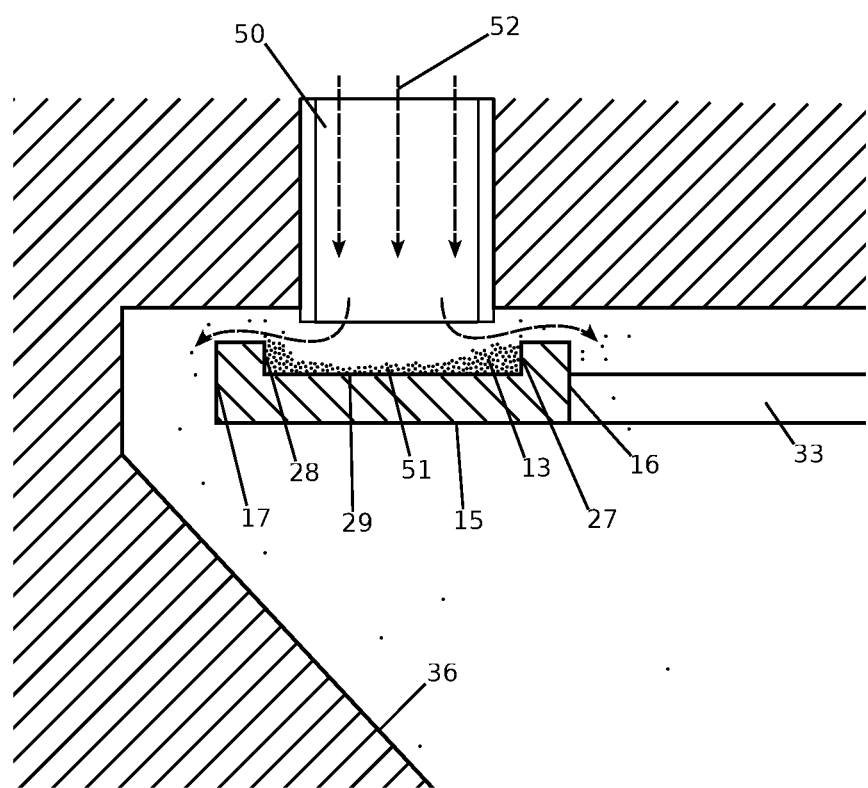

In an alternative embodiment, the inventive conveyor powder feeder includes a gas jet groove clearing mechanism. This feature would be utilized in applications that can tolerate gas flow. The gas jet groove clearing mechanism includes nozzle 50 that directs delivered gas (in the form of gas jet 52) on to rim 15. This embodiment is shown in FIGS. 11 and 12. As shown in these figures nozzle 50 is positioned above groove 26 at a location circumferentially between hopper 12 and distal end 53 of electrode 21. Gas jet 52 is delivered to nozzle 50 via ducting (not shown), which directs gas jet 52 onto groove 26 containing residual powder 51 remaining in groove 26 after having passed under electrode 21. Gas jet 52 emanating from nozzle 50 provides a motive force that clears residual powder 51 from groove 26. Nozzle 50 and gas jet 52 allow wheel 14 to be rotated at a higher rate than with electrode 21 alone. Using electrode 21 alone to evacuate groove 26 results in excellent low and mid-range flow rates, but a lower maximum powder flow rate. Using nozzle 50 alone to evacuate groove 26 results in consistent powder flow at high flow rates but poor consistency at low flow rates. The embodiment shown in FIG. 11 features both nozzle 50 and electrode 21 for a high maximum flow rate and excellent low flow rate performance. FIG. 12 shows a partial section view of the conveyor feeder having the gas jet groove cleaning mechanism that includes nozzle 50 and gas jet 52. As seen in this figure, gas jet 52 emanating from nozzle 50 causes residual powder 51 to be blown over inner radial edge 16 and outer radial edge 17 of rim 15. Residual powder 51 is then collected by funnel structure 36.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment(s) were chosen and described in order to best explain the principles of the present invention and its practical application, to thereby enable others skilled in the art to best utilize the present invention and various embodiments with various modifications as are suited to the particular use contemplated.

What is claimed is:

1. A powder feeder, the feeder comprising:
a body including a hopper, the hopper shaped and sized to hold a supply of powder particles;
a revolving conductive wheel having a rim, the rim having an inner radial edge, an outer radial edge and a powder landing surface disposed on the rim between the inner radial edge and the outer radial edge;
the powder landing surface being disposed below the hopper such that gravity acting upon the powder particles within the hopper causes the powder particles to fall upon the powder landing surface and create a pile of powder particles on the powder landing surface;
a voltage supply in electrical communication with an electrode and the wheel, the electrode and powder landing surface having a space between them;
an insulator disposed between the electrode and the wheel;
the voltage supply producing an alternating current electric potential between the electrode and the wheel that creates an alternating electric field within the space;
a chamber positioned below the wheel, the chamber having an outlet; and
the electric field created within the space causing the powder particles falling onto the powder landing surface and revolving under the electrode to develop an electrical surface charge and be subject to an electrostatic force that causes the powder particles to oscillate between the pile and the insulator and then after a period of oscillation drop over either or both of the inner radial edge and outer radial edge and into the chamber.

2. The powder feeder of claim 1 wherein the powder landing surface includes a groove defined by an inner radial sidewall proximate the inner radial edge, an outer radial sidewall proximate the outer radial edge and a floor extending between the inner radial sidewall and the outer radial sidewall.

3. The powder feeder of claim 1 wherein the electrode is positioned vertically above a portion of the powder landing surface of the wheel.

4. The powder feeder of claim 2 wherein:
the inner radial sidewall and outer radial sidewall are separated by a groove width;
the electrode has a radial electrode width; and
the radial electrode width is greater than the groove width.

5. The powder feeder of claim 1 wherein the wheel has a rotational speed of 0-20 revolutions per minute.

6. The powder feeder of claim 5 wherein the wheel has a diameter of 25 millimeters to 300 millimeters.

7. The powder feeder of claim 6 wherein a portion of the electrode superposes the groove and the portion of the electrode that superposes the groove has an arc length of at least 25 millimeters.

8. The powder feeder of claim 5 wherein the powder particles have a particle size of 10 to 150 microns.

9. The powder feeder of claim 7 wherein the alternating current electric potential has an alternating current signal frequency of between 30 to 300 Hertz.

10. The powder feeder of claim 9 wherein the groove has a depth of 0.1 to 2 millimeters.

11. The powder feeder of claim 10 wherein the insulator has a thickness of 0.2 to 4 millimeters.

12. The powder feeder of claim 2 wherein the insulator has a wheel-facing surface and the wheel facing surface is flat and parallel to the floor of the groove.

13. The powder feeder of claim 2 wherein the insulator has a wheel-facing surface and the wheel facing surface is shaped like a chevron pointing into the groove.

14. The powder feeder of claim 2 wherein the insulator has a wheel-facing surface and the wheel facing surface is angled such that the wheel facing surface is further from the outer radial edge than from the inner radial edge.

15. The powder feeder of claim 4 wherein the radial electrode width is two to three times the groove width.

16. The powder feeder of claim 1 wherein the electrode is circular in shape.

17. The powder feeder of claim 1 wherein the electrode is rectangular in shape.

18. The powder feeder of claim 1 wherein the chamber includes an inlet from which pressurized gas enters the chamber.

19. The powder feeder of claim 1 further including a nozzle directing a gas jet onto the groove.

20. The powder feeder of claim 17 wherein the nozzle is located above the groove at point on the rim circumferentially between the hopper and a distal end of the electrode.

* * * * *